United States Patent Office.

ELIJAH M. CARRINGTON, OF NEW YORK, N. Y., ASSIGNOR TO EDMUND I. WADE, TRUSTEE, AND SAID TRUSTEE ASSIGNS TO THE PATENT SELF-CEMENTING-BAND COMPANY.

Letters Patent No. 85,790, dated January 12, 1869.

IMPROVED COMPOSITION FOR MAKING SELF-CEMENTING BANDS.

The Schedule referred to in these Letters Patent and making part of the same.

Be it known that I, ELIJAH M. CARRINGTON, of the city and county and State of New York, have invented a certain new and useful Composition of Matter for Self-Cementing Bands, for encircling packages of bank-notes, and for other similar purposes; and I hereby declare that the following is a full and sufficient description thereof.

The nature of the invention consists in preparing a composition that will remain soft and sticky for a long time, although freely exposed to the sun and air, and which may be so controlled that two cemented surfaces will adhere with a force greater than the strength of the band used, by simple pressure of the thumb and finger; and although the cement is inclined to adhere to other substances, this tendency is counteracted by the intervention of a third substance, which controls its action, to adhere or not, at the will of the operator.

The materials of the cement are raw rubber or caoutchouc, dissolved in benzine, or benzole, or other equivalent volatile oil, forming thereby a compound cement, which is used to spread over the surface of sheet-fabric, as on the end parts of strips, or paper bands, belts, &c., for encircling bank-notes, letter-files, envelopes, bank-checks, and tags to be attached to bales of goods, packages, and labels; also to advertisements, &c.

The design of the invention being to form a specific compound having peculiar properties, it is necessary to describe the process of making it somewhat in detail.

The commercial article called benzine, or benzole, being one of the products of coal-tar, from coal-gas works, is separated from foreign bodies and sold for enriching the light of coal-gas, for cleaning clothes, for a burning-fluid, and other domestic uses.

The liquid is volatile, boils at 86° Fahrenheit, and evaporates rapidly when left exposed in an open vessel. It dissolves India rubber rapidly, and forms a sticky, tenacious, pasty composition, from which the liquid portion evaporates quickly, and leaves a thick, gummy mass. This composition constitutes the composition used for forming the self-cementing bands for putting up bank-notes, checks, envelopes, &c.

Suppose a band for encircling a package of bank-notes is to be formed, the paper-band strip is placed flat upon the table, and the cement is brushed on, at one end, upon the face of the band, and the lower face of the opposite end is treated in the same way. If the article be a tag, the cement is attached to the upper face at one end of the strip only, and is made fast by folding the cemented face upon itself, and forming a kind of hinge-joint for attachment, while the blank end is left loose for numbering or lettering, as the case may be.

In the manufacture of the bands, the adhesion of the cement was so great as to impede the progress of the work, and required a remedy. There was so much stickiness as to render it impracticable to cut the sheets into band-strips. At first, pulverulent substances were tried without effect, and oleaginous bodies were substituted, (brushed on.) These did not answer the purpose. It was difficult to put on an inappreciably thin coating. At last, a block of spermaceti, stearic acid, palmitin, or paraffine, and especially the last, was rubbed gently over the cemented surface, and left enough of its substance on the cement to admit of cutting up the sheet-fabric, and handling the same to any necessary extent. But the paraffine does not prevent cemented surfaces from adhering to each other.

Having stated the nature of the invention, and the method of using it,

What I claim as my invention, and desire to secure by Letters Patent, is—

The combination of the rubber, the benzine, or its equivalent volatile oil, and an unctuous substance, used substantially in the manner and for the purpose set forth.

ELIJAH M. CARRINGTON.

Witnesses:
G. N. BENSON,
JAMES W. POE.